Nov. 1, 1966 E. C. CASSIDY ET AL 3,282,187

FAST-OPERATING, LARGE-APERTURE SHUTTER

Filed March 9, 1965 5 Sheets-Sheet 1

INVENTORS
Esther C. Cassidy
Donald H. Tsai

BY

ATTORNEY

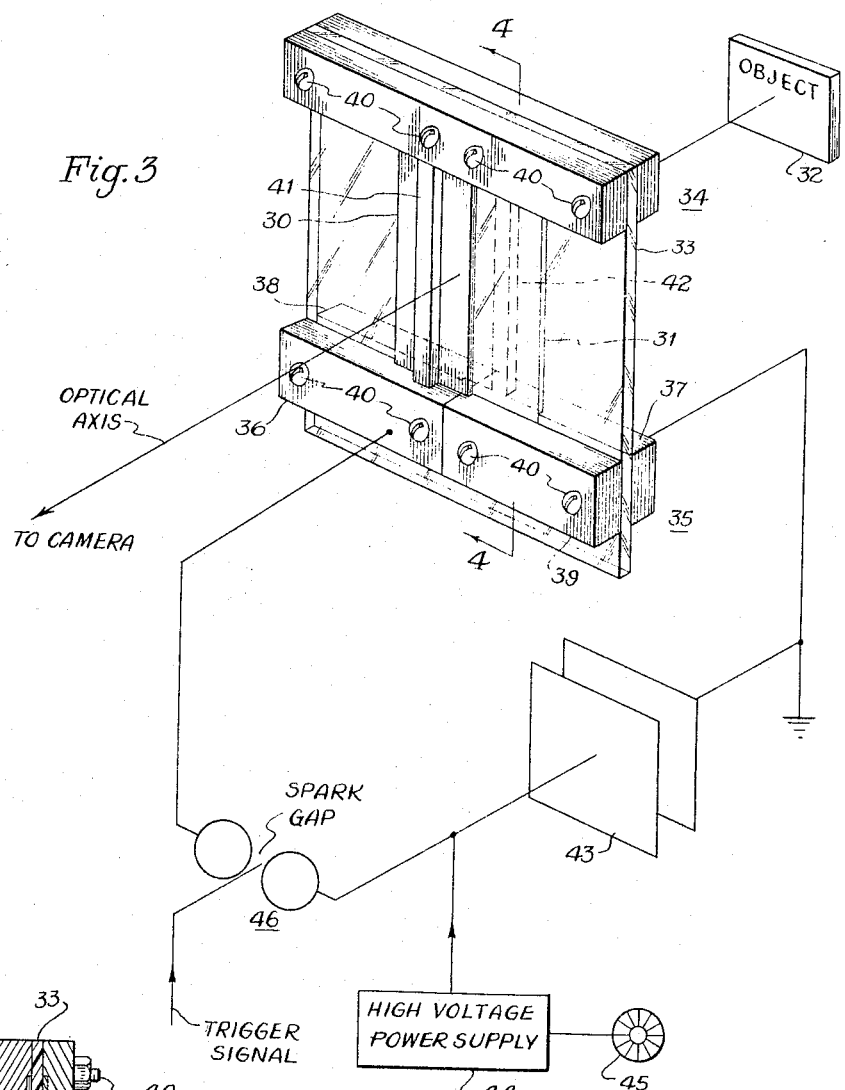
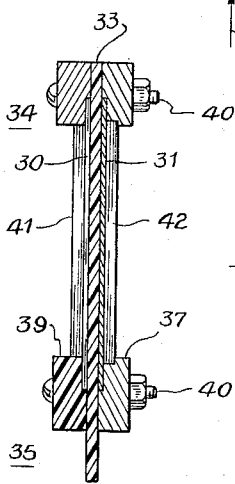

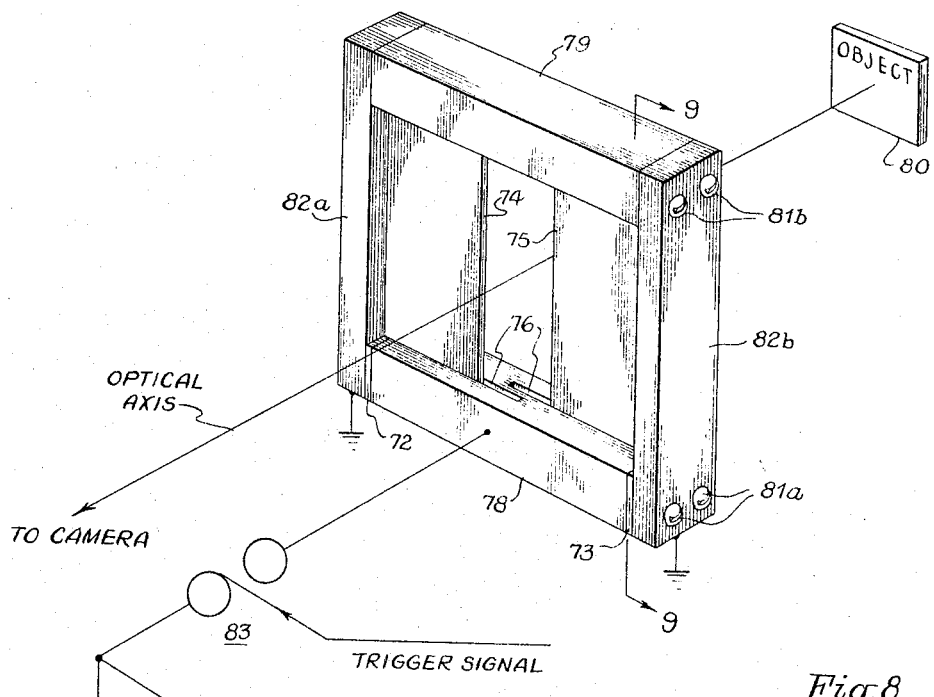
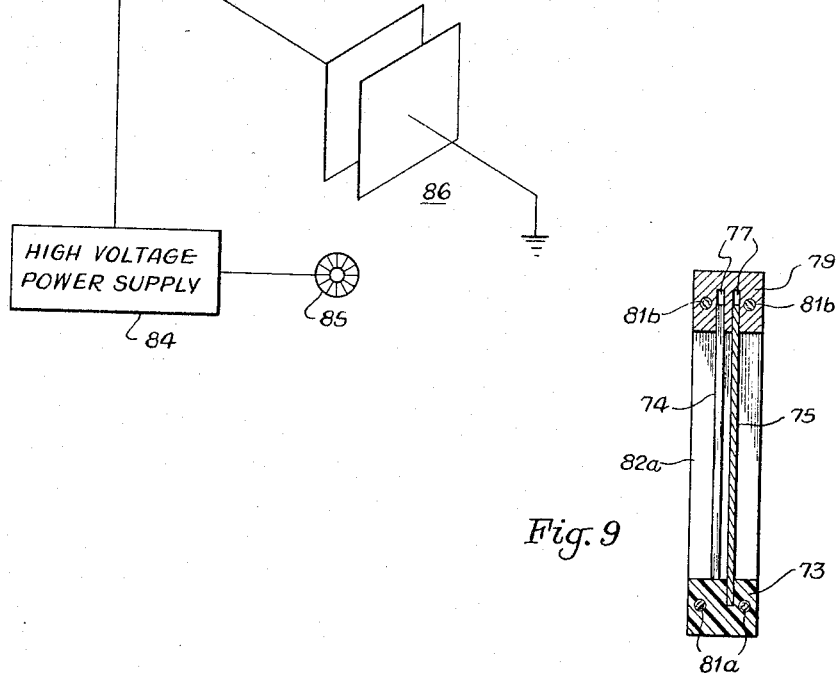
Fig. 8
Fig. 9

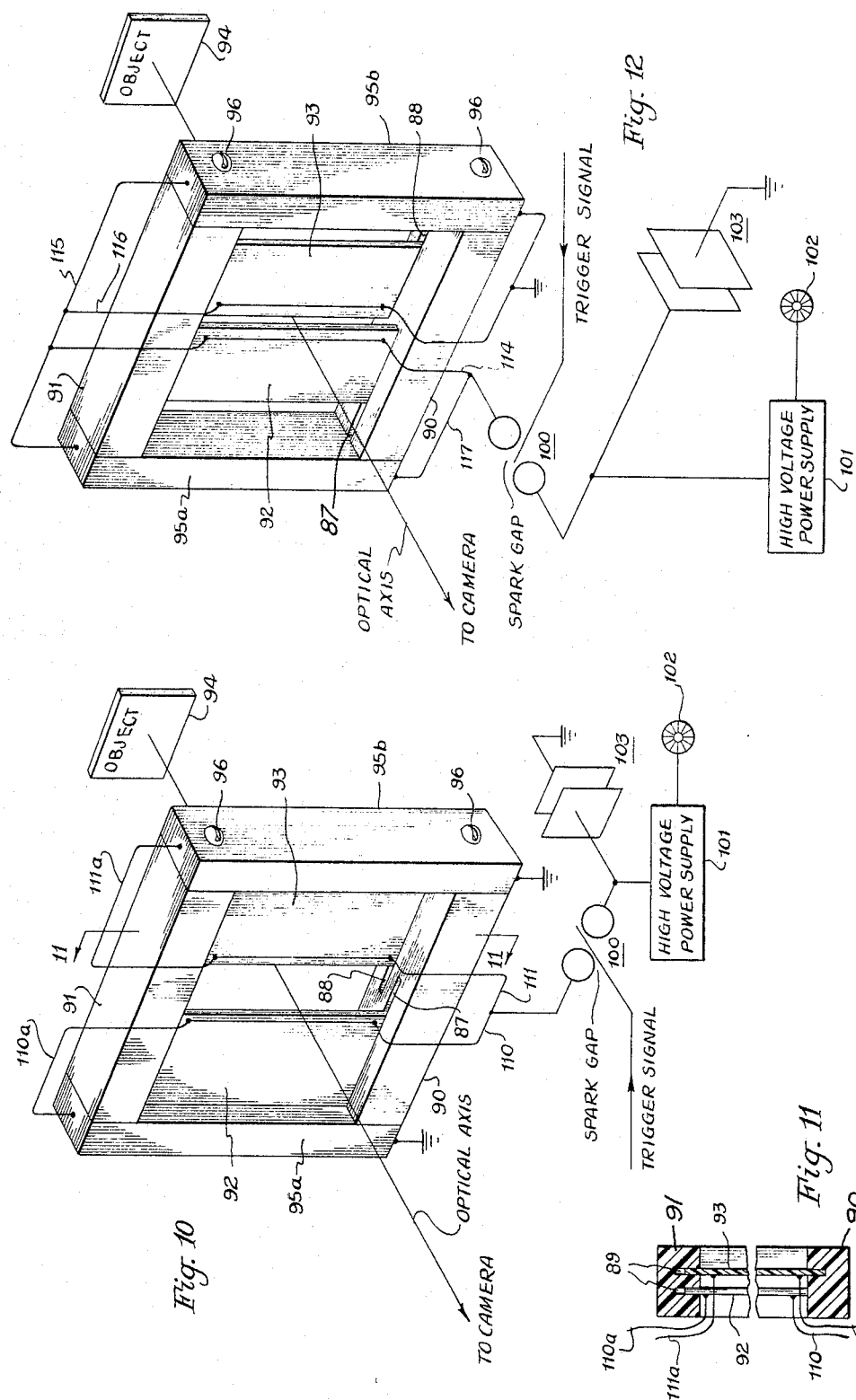

United States Patent Office 3,282,187
Patented Nov. 1, 1966

3,282,187
FAST-OPERATING, LARGE-APERTURE SHUTTER
Esther C. Cassidy, Chevy Chase, and Donald H. Tsai, Rockville, Md., assignors to the United States of America as represented by the Secretary of Commerce
Filed Mar. 9, 1965, Ser. No. 438,438
25 Claims. (Cl. 95—53)

This application is a continuation-in-part of U.S. patent application Serial No. 215,477, filed on July 31, 1962, by Esther C. Cassidy and Donald H. Tsai.

This invention relates to a fast-operating, large-aperture shutter.

In recent years, a number of high-speed photographic shutters have been developed. Of these, the Kerr-cell and Faraday type shutters polarize a beam of light reflected from an object, then selectively rotate the plane of polarization, and thereby control the passage of light through an analyzer to a camera. These shutters open and close in the submicrosecond range and may be used with comparatively large apertures, but are characterized by poor light transmission when open and a small but significant level of transmission when closed.

In an electromechanical shutter, a specially flattened, small enameled wire is bent back upon itself in a T configuration. All the parallel segments are held stationary, except the top segment of the T element or driver. With the driver seated squarely against a shutter plate, a high current surge is passed through the element and the driver imparts an impulse to the plate. After the impulse, the plate, moving as a relatively free object, opens an aperture. While this shutter has high speed and high transmission, it can be used with only a relatively small aperture.

An electro-optical shutter, developed recently, comprises a piece of plastic onto which an opaque coating of aluminum has been deposited. Spaced a short distance from the aluminized surface is a similar-sized piece of uncoated plastic. A comparatively large discharge from a capacitor evaporates the aluminum, leaving the shutter transparent. This shutter has high speed, medium to high transmission, and may be used with a large aperture. However, when the aluminum coating is evaporated a bright flash is emitted and any film exposed during the flash is badly fogged.

Accordingly, it is an object of the present invention to provide a fast-operating shutter that may be used with large apertures, has a high percent of light transmission when open, complete opacity when closed, and whose operation is not accompanied by a flash.

This is accomplished, in one instance, by constructing a shutter that comprises an opaque, metallic foil positioned in a circuit capable of providing a high surge of current. The foil covers an aperture. When the surge of current is passed through the circuit, the foil is buckled and compressed laterally by the electromagnetic forces that accompany the current. In another instance, the shutter comprises two opaque plates of conductive material. The surge of current passes through the plates in opposite directions, establishing electromagnetic forces that repel the plates to open the shutter.

More specifically, in one embodiment a foil is clamped between a pair of electrodes and is connected in series with a conductive member in the discharge circuit of an energy storage device, such as a capacitor. When the capacitor is discharged, a heavy surge of current is passed through the foil and the conductive member in opposite directions. The foil is then buckled and compressed laterally and is repelled by the conductive member to open the shutter. (See FIG. 1.) Without the conductive member, the shutter will of course open by virtue of the lateral buckling of the foil. The opening action will, however, be somewhat slower.

In another embodiment, two foils are mounted side by side in such a manner that an edge of one slightly overlaps an edge of the other, so that light will not pass through the overlapping edges. The overlapping edges are insulated from each other. The foils are connected in series, electrically, between a pair of electrodes. A conductive member is positioned relative to each foil, and the two members are connected together, electrically, in series between the electrodes. Thus, two parallel paths are established between the electrodes, which are positioned in a circuit capable of providing a high surge of current. When the surge of current is passed through the parallel paths, each foil is compressed laterally by the electromagnetic forces described above. In addition, each foil is repelled by the other foil and its related conductive member because each foil and its member carry current in a direction opposite to that of the other foil and its member. The opening action of this embodiment is therefore faster than that of the first. (See FIG. 3.)

In still another embodiment, a pair of plates are positioned side by side, an edge of one slightly overlapping an edge of the other. The overlapping edges are insulated from each other. The plates are slidably supported in a common conductor at one end and each plate is slidably supported in a respective electrode at the other end. A conductive member is positioned relative to each plate and is connected electrically to the common conductor and to the electrode supporting its related plate. Thus, two parallel electrical paths are established between the electrodes. When a surge of current is passed through the parallel paths, the current flows in opposite directions through the plates and they repel each other by virtue of the electromagnetic forces established by the fields that accompany the current. In addition, the current flows through each plate and its associated conductive member in the same direction, and consequently each plate is attracted to its related conductive member and is repelled by the member related to the other plate. In this way the fast-opening action of the shutter is achieved. (See FIG. 5.)

In other embodiments described below:

(1) A surge of current is passed through the plates of conductive material in the same direction and through each plate and a related conductive member in opposite directions to establish electromagnetic forces that cause the slidably mounted plates to move together, thereby closing the shutter (FIG. 8).

(2) The current is passed in the same direction through two flexible, electrically parallel conductors, each mounted on a respective plate of nonconductive material and through each conductor and a related conductive member in opposite directions to establish electromagnetic forces that cause the slidably mounted plates to move together to close the shutter (FIG. 10).

(3) The current is passed in opposite directions through two conductors mounted on two plates of nonconductive material and through each conductor and a related conductive member in the same direction to establish electromagnetic forces that cause the plates to move apart, opening the shutter (FIG. 12).

In the figures:
FIG. 1 is a first embodiment of the present invention;
FIG. 2 is a section taken along line 2—2 in FIG. 1;
FIG. 3 is a second embodiment;
FIG. 4 is a section taken along line 4—4 in FIG. 3;
FIG. 5 is a third embodiment;
FIG. 6 is a section taken along line 6—6 in FIG. 5;
FIG. 7 is a section taken alonge line 7—7 in FIG. 5;
FIG. 8 is a fourth embodiment;

FIG. 9 is a section taken along line 9—9 in FIG. 8;

FIG. 10 is a fifth embodiment;

FIG. 11 is a section taken along line 11—11 in FIG. 10; and

FIG. 12 is a sixth embodiment of the present invention.

Figure 1:
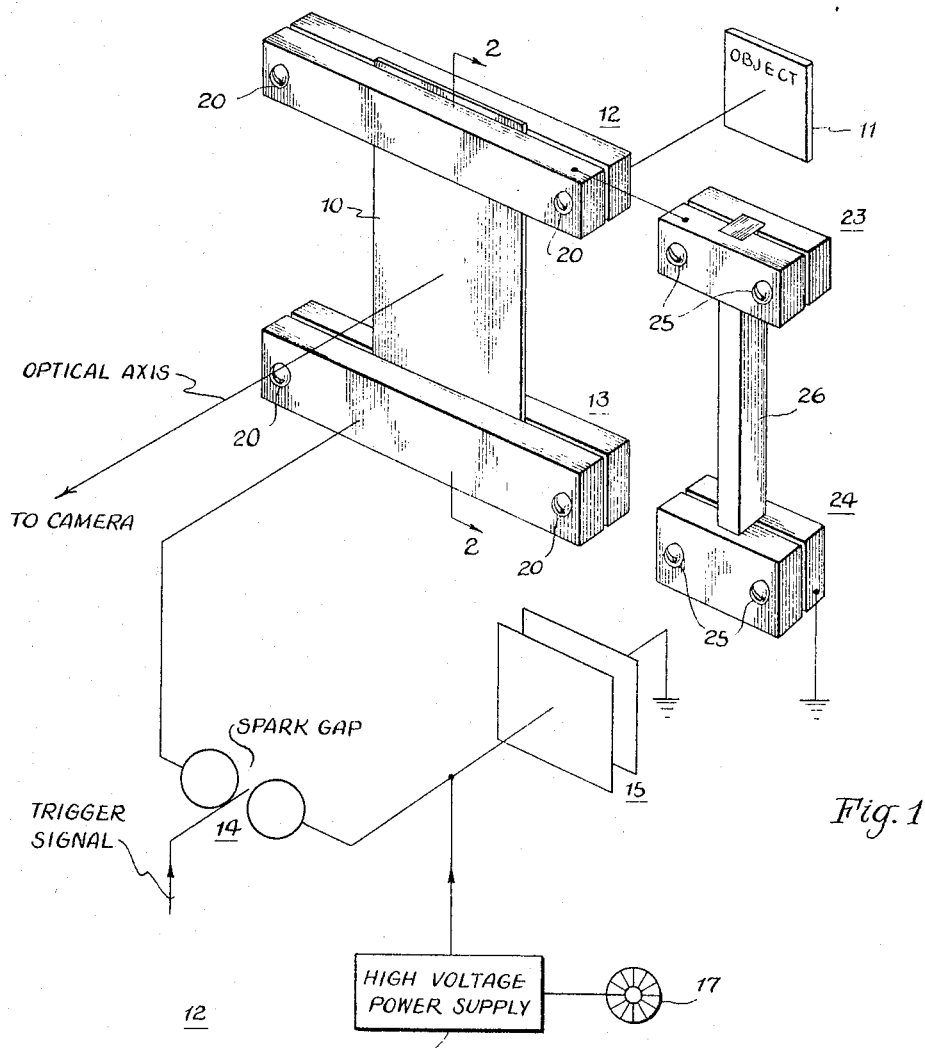
Figure 2:
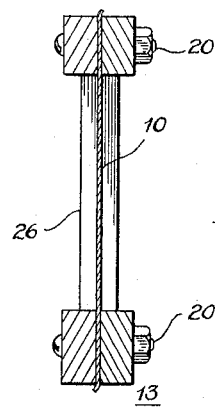

With reference to FIGS. 1 and 2, foil 10 is positioned in the path of the light to be shuttered, for example along the optical axis between object 11 and a camera, not shown. The foil is formed of an opaque, conductive material, such as copper, aluminum or Monel, and comprises filaments having a width $dx$, thickness $h$ and the same length as the foil. The clamps are made rather massive to reduce the distortion when tightened by nut-and-bolt assemblies 20 and to provide good electrical contact with the foil. Conductive member 26 is held in clamps 23 and 24 by means of the nut-and-bolt assemblies 25.

The trigger signal, applied to spark gap 14, is a high voltage pulse which may be derived from a thyratron or other trigger circuit, not shown, whose operation is synchronized with that of the camera.

The level of energy stored in capacitor 15 is a function of the voltage applied across its plates by high voltage power supply 16 and may be defined by the following equation:

$$\text{Energy stored in capacitor } 15 = \tfrac{1}{2}CV_0^2$$

where C is the capacitance of capacitor 15 and $V_0$ is the voltage applied across the plates of the capacitor. The level of the latter voltage is set by adjusting dial 17, which is located on and controls the output voltage of power supply 16.

The voltage level applied to capacitor 15 is fixed in any particular application and may be determined by the method described below. (See "Optimum Energy Input.")

In operation, capacitor 15 is charged by power supply 16, and spark gap 14 is fired by the trigger signal. When the spark gap is ionized, the capacitor is discharged and a heavy surge of current passes through foil 10 and conductive member 26. The interaction of the electromagnetic fields established by the current flow through the foil-filaments establish forces that cause the foil to be buckled and compressed laterally to a form resembling a string. Since the current in foil 10 is in a direction opposite to that of the current flow in conductive member 26, the foil is repelled by 26 and is blown out of clamps 12 and 13. In this way, the fast opening-action of the shutter is achieved.

It will be apparent that clamp 23 could be tied to ground instead of to clamp 12 and that clamp 24 could be connected to 13 instead of to ground. The surge of current would then flow through foil 10 and conductive member 26 in the same direction to establish electromagnetic forces that compress and buckle the foil and propel it toward member 26. Thus, the shutter would be opened.

Further, another conductive member could be supported in clamps positioned on the other side of foil 10 from member 26 and could be connected between clamp 12 and ground in the same manner as 26. The surge of current would then flow through foil 10 in a direction opposite to that of the current flow in member 26 and the newly-added conductive member. The foil would then be buckled and compressed to the form of a string, and because it is repelled with substantially equal electromagnetic forces, the string-foil would tend to remain in the center of and between clamps 12 and 13. However, in practice the forces are so violent that the foil is almost invariably torn from the electrodes and blown away. This shutter would open with a greater speed than the one represented in FIG. 1.

It will also be apparent that clamp 12 could be connected to ground instead of to clamp 23 so that conductive member 26 is removed from the circuit. The operation of this shutter would be essentially the same but somewhat slower than the one illustrated in FIG. 1 because the additional forces added by virtue of conductor 26 and the second conductive member are not present.

With reference to FIGS. 3 and 4, foils 30 and 31 are made of opaque, conductive material, such as copper, aluminum, or Monel, and are positioned in the path of the light to be shuttered, for example on the optical axis between the object 32 to be photographed and the camera, which is not shown. The foils are mounted on opposite sides of transparent plastic sheet 33 and overlap slightly in order to prevent the passage of light at the center. The plastic sheet supports clamps 34 and 35 and insulates the foils from one another. The former clamp is made entirely of conductive material and forms a common conductor to which the foils are connected, while the latter clamp comprises electrodes 36 and 37 and insulators 38 and 39. It is noted that electrodes 36 and 37 are insulated from each other by plastic sheet 33 and insulators 38, 39, and that each of the electrodes are connected to a respective one of the foils 30, 31.

Clamps 34, 35 are made comparatively massive. This reduces distortion when they are tightened by nut-and-bolt assemblies 40 and provides good electrical contact with foils 30, 31.

Conductive member 41 is positioned between electrode 36 and clamp 34, while conductive member 42 is positioned between the electrode 37 and clamp 34. Members 41 and 42 may be placed in contact with foils 30 and 31, respectively, or each member may be spaced away from its associated foil. For most efficient operation, the distance between the latter members should determine the width of the aperture of the shutter, but it will be understood that each member may have a variety of positions relative to its related foil, depending upon the operation desired.

The level of voltage applied to capacitor 43 by high voltage power supply 44 may be selectively set by dial 45. As in FIG. 1, the voltage level in any particular application is fixed and may be determined by the method described below. (See "Optimum Energy Input.")

In operation, after capacitor 43 is charged to a preset energy level by power supply 44, spark gap 46 is fired by the trigger signal. When the spark gap is ionized, the capacitor is discharged through a circuit that includes electrode 36, foil 30, clamp 34, foil 31, and electrode 37 and through a parallel circuit that includes electrode 36, member 41, clamp 34, member 42 and electrode 37. As the heavy surge of current, caused by the discharge of the capacitor, is passed through the foil-filaments and conductive members, the interaction of the electromagnetic forces, established by the fields that accompany the current, cause each foil to be buckled and compressed laterally. In addition, each foil is repelled from the other because the foil and its related conductive member carry current in a direction opposite to that of the other foil and its related member. The opening-action of the shutter is therefore even faster than the one described in FIG. 1.

It will be apparent that the shutter in FIG. 3 could be utilized without conductive members 41 and 42, but the speed of the shutter would be somewhat reduced.

Figure 5:
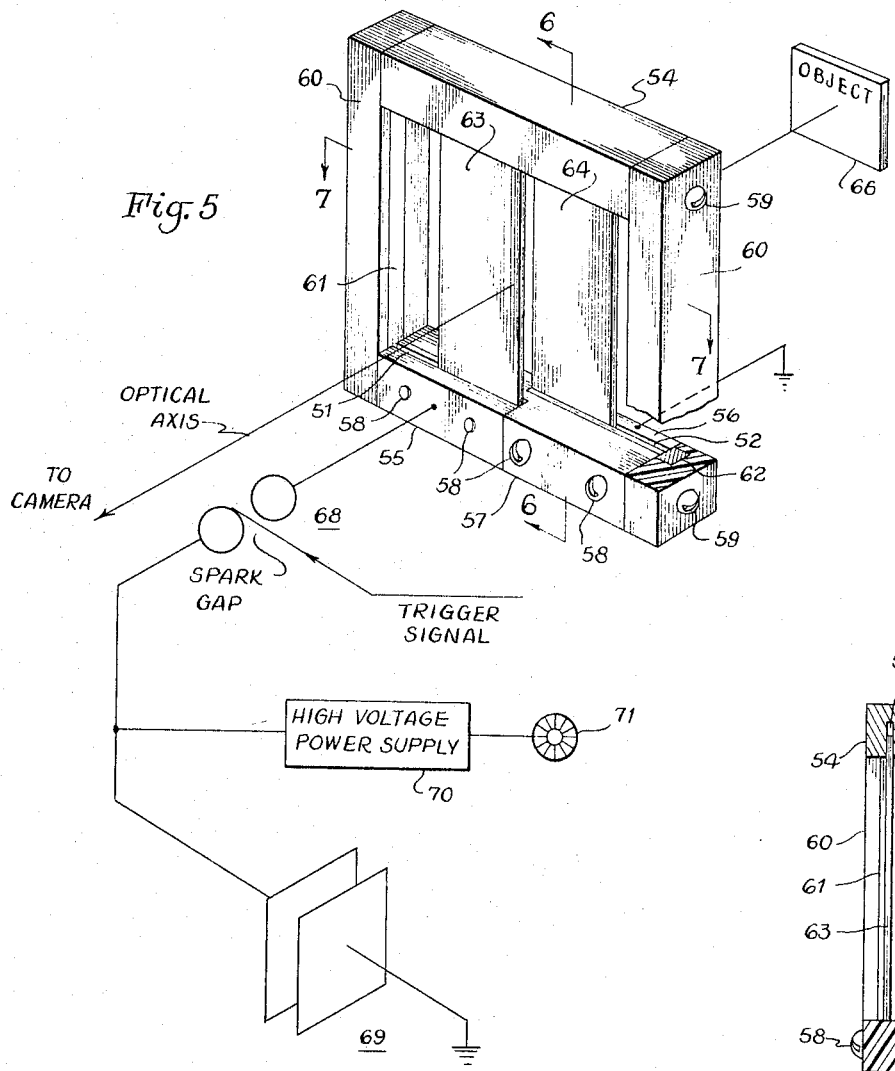
Figure 6:
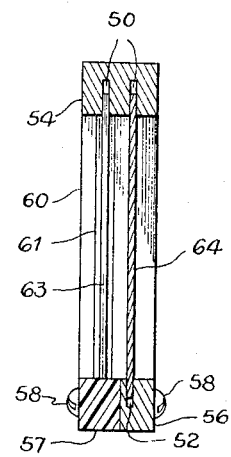
Figure 7:
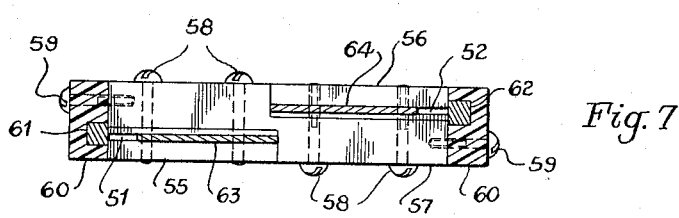

With reference to FIGS. 5 to 7, grooves 50 to 52 are located in electrodes 54 to 56, respectively. Electrodes 55 and 56 are connected to insulator 57 by screws 58 in such a manner that grooves 51 and 52 overlap slightly. Insulator 57 and electrode 54 are connected by means of screws 59 to members 60, which are made of nonconductive material.

Each conductive member 61 and 62 is positioned in one of the nonconductive members 60, adjacent to a respective end of slot 50 and adjacent to the end of a respective one of the slots 51 and 52. Member 61 is in electrical contact with electrodes 54 and 55 and member 62 is in electrical contact with electrodes 54 and 56.

Shutter plates 63, 64 are positioned in grooves 50 to 52, so that they overlap slightly, in the path of the light to be shuttered, for example along the optical axis between the object 66 to be photographed and the camera, which is not shown. The plates are made of stiff, opaque, conductive material.

As in the embodiments previously described, the trigger signal applied to spark gap 68 is a high voltage pulse and may be derived from a thyratron or other trigger circuit, not shown, whose operation is synchronized with that of the camera.

The magnitude of energy stored in capacitor 69 by high voltage supply 70 is dependent upon the setting of dial 71. The magnitude of energy for any particular application is fixed and may be determined by the trial-and-error method described below. (See "Optimum Energy Input.")

In operation, after capacitor 69 is charged by power supply 70, the spark gap 68 is fired by the trigger signal. The capacitor is then discharged through a circuit that comprises electrode 55, plate 63, electrode 54, plates 64 and electrode 56 and through a parallel circuit that comprises electrode 55, conductive member 61, electrode 54, conductive member 62 and electrode 56. Since the current flow in member 61 is in the same direction as the current flow in plate 63, the plate is attracted to the member. Likewise, plate 64 is attracted to conductive member 62. Since the flow of current in plate 63 is opposite in direction to the flow of current in plate 64, the plates repel one another. Likewise, member 61 repels plate 64 and member 62 repels plate 63. Thus, the plates move in grooves 50 to 52, as relatively free bodies, to open the aperture of the shutter.

With reference to FIGS. 8 and 9, shutter plates 74, 75 are made of stiff, opaque, conductive material. The plates are slidably mounted in grooves 76, 77 of electrodes 78, 79 and are positioned in the path of the light to be shuttered, for example along the optical axis between the object 80 to be photographed and a camera, not shown. Grooves 76, as shown in FIG. 8, overlap slightly. Insulator 72 is located between one end of electrode 78 and member 82a, while insulator 73 is positioned between the other end of the same electrode and member 82b. The insulators 72, 73 and electrode 78 are held in position between members 82a and 82b by means of screws 81a. Members 82a and 82b are constructed of conductive material.

Spark gap 83, power supply 84, dial 85 and capacitor 86, as well as the trigger signal applied to the spark gap and the magnitude of energy stored in the capacitor, are essentially the same as their respective counterparts in the embodiment disclosed in FIG. 5.

In operation, when the desired level of energy is stored in capacitor 86 and the trigger signal fires spark gap 83, the capacitor is discharged through shutter plates 74, 75. The surge of current, resulting from the discharge of the capacitor, flows through one circuit that includes electrode 78, plate 74, electrode 79 and member 82a and through another that includes electrode 78, plate 75, electrode 79 and member 82b. The current flows through the plates in the same direction, establishing electromagnetic forces of attraction between the plates. Current flows through plate 74 and member 82a in opposite directions, so that the plate and member repel each other; plate 75 and member 82b repel each other for the same reason. Thus, the plates move toward each other, as relatively free bodies, in grooves 76 and 77 to close the shutter.

With suitable synchronizing means, known in the prior are, the fast-opening shutter in FIGS. 1, 3, 5 or 12 and the fast-closing shutter in FIGS. 8 or 10 could be positioned along the same optical axis. The former would then open to permit transmission of light while the latter would close to block the transmission of light along the same path.

With reference to FIGS. 10 and 11, grooves 87 to 89 are located in members 90, 91. Shutter plates 92, 93 overlapping slightly, are positioned in the grooves in the path of light to be shuttered, for example along the optical axis between object 94 to be photographed and the camera, not shown. The grooves serve to guide the plates and are dimensioned so that they will not bind the plates. Supporting members 95a and 95b are made of conductive material and are connected between members 90, 91 by means of screws 96. The latter members and plates 92, 93 are fashioned of suitable nonconductive materials. The plates are comparatively thin and opaque.

Spark gap 100, power supply 101, dial 102, capacitor 103, and the trigger signal applied to the spark gap are substantially identical to their respective counterparts in the embodiment presented in FIG. 5. The level of energy stored in capacitor 103 may be determined by the trial-and-error method described below under "Optimum Energy Input."

Conductors 110 and 110a are connected in series between spark gap 100 and conductive member 95a. In a similar fashion, conductors 111 and 111a are connected in series between the spark gap and conductive member 95b. Each conductor 110, 111 is mounted by suitable means, not shown, along an inner edge of its related plate, and each conductive member 95a, 95b is grounded.

Since the force between conductors is inversely related to the distance between them, the conductors are mounted very close to the inner edges of the plates, but not so close that there is arcing between them when the plates are drawn together. The conductors 110, 110a, 111 and 111a are flexible and insulated.

In operation when capacitor 103 is discharged, a surge of current flows through conductor 110 and member 95a in opposite directions and through conductors 110 and 111 in the same direction to establish electromagnetic forces of repulsion between the conductor 110 on plate 92 and member 95a and electromagnetic forces of attraction between conductor 111 on plate 93 and conductor 110. In a similar manner, the current flow in conductor 111 and 95b, which is in opposite directions, establishes electromagnetic forces of repulsion between the conductor on plate 93 and member 95b. The plates therefore move together in grooves 87, 88 and 89 to close the shutter.

It will be apparent that instead of connecting conductors 110 and 111 to conductive members 95a and 95b, respectively, each of the former conductors could be grounded directly and the operation of the shutter, although slower, would be essentially the same as described above.

Like reference numerals designate like parts in FIGS. 10 to 12.

With reference to FIG. 12, conductor 115 is tied between conductive members 95a and 95b. Conductor 114 is connected between one side of spark gap 100 and conductor 115, and conductor 116 is connected between 115 and ground. Member 95a is tied to one end of spark gap 100 by means of conductor 117 and member 95b is grounded. Conductors 114, 115, 117 and 116 are flexible and insulated.

Conductors 114 and 116 are mounted very close to the inner edges of plates 92 and 93, respectively, but not so close that arcing occurs between sections of the conductor when the plates are drawn together. The energy level stored in capacitor 103 in FIG. 12 is essentially equal to the energy level stored in the same capacitor in FIG. 10 and may be determined by the same method.

In operation, when spark gap 100 is fired by the trigger signal and capacitor 103 is discharged, the current flow in conductors 114 and 116 is in opposite directions and the current flow in conductor 114 and member 95a is in the same direction, whereby the conductor on plate 92 is attracted to member 95a and is repelled by the conductor on plate 93. Likewise, the direction of current flow in conductors 114 and 116 and member 95b is such that the conductor on plate 93 is attracted to member 95b and is repelled from the conductor on plate 92. Hence, the plates move away from each other in grooves 87 to 89 to open the shutter.

It will be apparent that if conductors 115 and 117 were disconnected and conductors 114 and 116 were tied together at member 91, current would flow in opposite directions through the latter conductors, and the operation of the shutter would be somewhat slower but essentially the same as set forth above.

It will also be apparent that members 90, 91, 95a, 95b and grooves 87 to 89 are used merely to support and guide shutter plates 93, 92; and that the plates could be supported and guided in any number of other ways. For example, the plates could be mounted on two ribbons of conductive material, the ribbons being sufficiently stiff to support the plates but sufficiently flexible to permit the plates to move apart when a surge of current flows in one direction through one ribbon and in the opposite direction through the other ribbon.

In the following paragraphs, the qualitative effects of some of the design parameters on the operating speed of the shutters in the various embodiments are briefly discussed. Although the components referred to are, in most instances, found in FIG. 3, it is understood that the same or similar considerations apply to the embodiments in the other figures.

Optimum energy input

For the purposes of the following discussion, a foil filament is defined as a section of foil 30 or 31 (FIG. 3) that has a width $dx$, thickness $h$, and the same length as the foil, where the width of the foil is designated as $x$.

In order to obtain a prescribed aperture in the shortest time with given foils in a circuit of fixed parameters, the velocity of the foil flaments should be as high as possible throughout the opening period. This means that the impulse applied to the filaments during the discharge of capacitor 43, should be as high as possible during the opening period. However, the electrical energy must not be so high as to cause combustion, since the resulting flash, sometimes accompanied by an arc discharge, would expose the film or otherwise disturb the light-valving action of the shutter. Moreover, the force on the filaments at any instant should not be so high as to cause excessive stresses in the foils, because this would shatter them, interrupt the current path, and consequently reduce the force on the foil filaments. These considerations determine in part the optimum electrical energy input into the foils.

The energy input to the shutter in FIG. 3 is the amount of energy delivered from capacitor 43 to the foils 30, 31 and conductive members 41, 42 when spark gap 46 is ionized. The energy input may be defined as:

$$\int_0^\tau I^2 R\,dt \text{ or as } \int_0^\tau VI\,dt$$

where $\tau$ is the duration of flow of the discharge current, I is the instantaneous discharge current, R is the resistance of the parallel circuit that includes the foils and the conductive members, V is the voltage across the foils and conductive members and $t$ is time.

For a given material of predetermined dimensions, the optimum electrical energy input to foils 30, 31 may be obtained by a trial-and-error method. In one such method, the energy stored in capacitor 43 by the power supply is adjusted by dial 45 until combustion of the foils occurs on discharge of the capacitor. The level of the energy stored in the capacitor is then reduced until the only combustion of the foils that occurs is near the edges of clamps 34, 35. Combustion of the foils begins at the edges of the clamps because of contact resistance between the foils and clamps at these points. If suitable light baffles are used, this combustion may be tolerated without exposing the film in the camera or otherwise disturbing the light-valving action. If, however, it is desired to eliminate all combustion, the energy level stored in the capacitor is further reduced until this condition prevails. Experience has shown that for a given material, the optimum energy input per unit mass of foil remains approximately constant.

In a similar manner, the optimum energy input to shutter plates 63, 64 in FIG. 5 or shutter plates 74, 75 in FIG. 8 may be determined by a trial-and-error method. For example, for a given material of certain dimensions, the optimum energy for the plates may be determined by increasing the energy stored in capacitor 69 to the point where discharge of the capacitor will not buckle, burn, or shatter the plates. Likewise, the optimum energy input for conductors 110, 111 in FIG. 10 or conductors 114 and 116 in FIG. 12 may be determined by increasing the energy stored in capacitor 103 to the point where discharge of the capacitor will occur without failure (explosion or burning) of the conductors.

Circuit parameters

The capacitance C, resistance R, and inductance L of the shutter circuit in FIG. 3 affect the current as well as the duration of the discharge of capacitor 43. These parameters therefore affect the impulse to foils 30, 31 and the distribution of the impulse during the discharge. It was found by experiments with given foils, for which the energy input was adjusted to the optimum level, that a relatively large change in the capacitance of the circuit (from 15 to 30 microfarads) had essentially no effect on the opening of the shutter.

Since the current is inversely related to the resistance, it is apparent that a low value of R is desirable. The resistance R in the circuit is mainly that of foils 30, 31. If the size of the foils is kept the same, then the resistance can be changed only by changing the material or the resistivity of the foils. In general, this also requires a change in the optimum energy input and in the mass (density) of the foils. To determine the effect of changing the resistance (foil materials), therefore, one must balance this effect with the effects of the concurrent changes in the optimum energy level and in the mass (density) of the foils.

The inductance L of the circuit is determined primarily by the geometry of the circuit and is not easily adjustable in a particular application. However, generally speaking, a low inductance results in a high peak current and a short duration of discharge and a high inductance has the opposite effect. If the inductance should be too low and the peak current too high, the compressive force and the mechanical stresses in foils 30, 31 might become excessive and cause shattering of the foils. On the other hand, if the inductance should be too high and the current too low, the duration of the discharge would be long and the opening of the shutter would be slow. The optimum inductance clearly lies between these extremes.

Size of the foil

In a specific application, the length of the foil may be considered as fixed by the size of the desired aperture. The effects of the width $x$ and thickness $h$ of the foil may be discussed by examining their influence on the driving force, the mass of the filament, and the stiffness of the foil.

The impuse on the foil filament is related to $h^2$. The mass of the filament is directly proportional to $h$. The stiffness of the foil per unit length before buckling is proportional to $h^3$. After buckling, the stiffness is greatly reduced. From the foregoing considerations, one may state that if the force is sufficient to cause the foil to buckle, then the shutter with foils of larger $h$ would have a higher opening speed, because the impulse that may be applied to the filament before combustion occurs increases faster than the mass of the filament, and the stiffness does not offer much resistance after the foil buckles. On the other hand, if the thickness $h$ is increased too much, the foil would become so stiff that it would not buckle at all, and there would be no opening of the shutter in this figure.

It may be concluded, therefore, that if the electromagnetic forces are sufficient to cause the foil to buckle, then the shutter with foils of greater thickness should open faster.

If only the width $x$ of the foil is changed, the force on a foil filament is affected; but the mass of a filament and the stiffness of the foil are unaffected. If $x$ is increased, the optimum energy input is increased and the opening speed of the shutter becomes faster. Another advantage of a wider $x$ is that since the edges of foils 30, 31 are torn from the clamping electrodes 36, 37 in the process of opening, the interruption of the current path at the edges is less significant for wider foils. The maximum value of $x$ is limited by the stored energy available and also by the relation between the force on each filament and the stored energy. For a flat foil, this relation is usually logarithmic so that when one increases the stored energy, one soon reaches a point of diminishing returns, as far as force on the filament is concerned.

From the above, it is apparent that the foil may be made wider than the aperture; and that a wider foil will carry more total current and will collapse faster per unit area. Another way of increasing the effective width of the foil, and hence the force on each foil filament, is to use a corrugated foil.

*Examples*

The following chart presents typical examples of the opening speed of the shutter in FIG. 3 (when conductive members 41 and 42 were not used) to an aperture 1 inch wide x 3 inches long, with the foil material and dimensions, capacitance and stored energy indicated in the chart.

| Material | Width (in.) | Thickness (in.) | Capacitance (microfarad) | Stored Energy (joules) | Opening Time (mc./sec.) |
|---|---|---|---|---|---|
| Copper | 1 | 0.001 | 15 | 924 | 62 |
| Do | 1 | 0.001 | 30 | 920 | 60 |
| Aluminum | 1 | 0.001 | 15 | 580 | 50 |
| Do | 1 | 0.0005 | 15 | 298 | 57 |
| Do | 1.5 | 0.0005 | 15 | 450 | 50 |
| Do | 2 | 0.0005 | 15 | 580 | 43 |

It is noted that the results shown in the chart are in agreement with the conclusions presented above. The chart, for example, shows the effect of aluminum foils of three widths, 1 in., 1.5 in., and 2 in., respectively, on the opening of the shutter. The results show that the highest opening speed was obtained with the widest foil to which the greatest stored or optimum energy could be applied. Also, the thicker aluminum foil having 0.001 in. thickness, to which 580 joules (the optimum energy input) could be applied, had a faster opening speed than the aluminum foil having 0.0005 in. thickness to which 298 joules could be applied.

What is claimed is:

1. A shutter comprising: a light shield including a plurality of conductive paths,
   said shield being positioned to control the passage of light through an aperture so that in a first condition said shield blocks the passage of light through said aperture and in a second condition unblocks the passage of light through said aperture, and
   means for generating and passing a surge of current through each of the conductive paths of said light shield, thereby setting up an electromagnetic field about each path which exerts electromagnetic forces on all others of the plurality of conductive paths,
   the magnitude and direction of the current through each conductive path and the orientation of the conductive paths relative to each other being such that the resultant of the interacting electromagnetic forces substantially alone changes said shield from one of said first and second conditions to the other of said first and second conditions.

2. A shutter comprising: an opaque member including at least one strip of conductive material,
   said member being positioned to control the passage of light through an aperture so that in a first condition said member blocks the passage of light through said aperture and in a second condition unblocks the passage of light through said aperture,
   a conductive member, and
   means for generating and passing a surge of current through said strip of conductive material and said conductive member, thereby setting up an electromagnetic field about the strip of conductive material which exerts an electromagnetic force on said conductive member and an electromagnetic field about the conductive member which exerts a force on said strip of conductive material,
   the magnitude and direction of the current through said strip of conductive material and through said conductive member and the orientation of the conductive member relative to the strip of conductive material being such that the resultant of the interacting electromagnetic forces substantially alone changes said opaque member from one of said first and second conditions to the other of said first and second conditions.

3. A shutter comprising: an opaque foil of conductive material having a plurality of conductive paths,
   said foil being positioned to control the passage of light through an aperture, and
   means for generating and passing a surge of current through each of the conductive paths of said foil, thereby setting up an electromagnetic field about each path which exerts electromagnetic forces on all others of said plurality of conductive paths,
   the magnitude and direction of the current through each conductive path and the orientation of the conductive paths relative to each other being such that the resultant of the interacting electromagnetic forces substantially alone causes said foil to be buckled and compressed.

4. A shutter comprising: an opaque foil having a plurality of conductive paths,
   said foil being positioned to control the passage of light through an aperture,
   a conductive member, and
   means for generating and passing a surge of current through each of the conductive paths of said foil and said conductive member, thereby setting up an electromagnetic field about each path which exerts electromagnetic forces on all others of said plurality of conductive paths and on said conductive member and thereby setting up an electromagnetic field about said conductive member which exerts a force on each of said plurality of conductive paths,
   the magnitude and direction of the current through each conductive path and the orientation of the conductive paths and the conductive member relative to each other being such that the resultant of the interacting elecromagnetic forces subsantially alone causes said foil to be buckled and compressed.

5. A shutter comprising: a first and second opaque member including a first and second strip of conductive material, respectively,
   said opaque members being positioned to control the passage of light through an aperture so that in a first condition said opaque members block the passage of light through said aperture and in a second condition unblock the passage of light through said aperture, and
   means for generating and passing a surge of current through said first and second strips of conductive material, thereby setting up an electromagnetic field about each strip which exerts an electromagnetic force on the other strip of conductive material,
   the magnitude and direction of the current through said first and second strips and the orientation of the strips relative to each other being such that the resultant of the interacting electromagnetic forces substantially alone changes said first and second opaque members from one of said first and second conditions to the other of said first and second conditions.

6. The shutter set forth in claim 5 wherein said first and second opaque members each comprise a plate of conductive material.

7. The shutter set forth in claim 5 wherein said first and second opaque members each comprise a foil of conductive material.

8. The shutter set forth in claim 5 wherein said first and second opaque members each comprise a plate of nonconductive material having a conductor mounted thereon and wherein said current is passed through the conductors.

9. A shutter comprising: a first and second opaque member including a first and second strip of conductive material, respectively, said opaque members being positioned to control the passage of light through an aperture so that in a first condition said opaque members block the passage of light through said aperture and in a second condition unblock the passage of light through said aperture, a first and second conductive member, and means for generating a surge of current and for passing said current through said first and second conductive member and through said first and second strip of conductive material, thereby setting up an electromagnetic field about each conductive member and each conductive strip which exerts a force on each of the other conductive members and strips, the magnitude and direction of the current through each conductive member and conductive strip and the orientation of the conductive members and strips relative to each other being such that the resultant of the interacting electromagnetic forces substantially alone changes said opaque members from one of said first and second conditions to the other of said first and second conditions.

10. The shutter set forth in claim 9 wherein said first and second opaque members each comprise a plate of conductive material.

11. The shutter set forth in claim 9 wherein said first and second opaque members each comprise a foil of conductive material.

12. The shutter set forth in claim 9 wherein said first and second opaque members each comprise a plate of nonconductive material having a conductor mounted thereon and wherein said current is passed through the conductors.

13. A shutter comprising: a first and second opaque member, each including a first and second strip of conductive material, said opaque members being positioned to control the passage of light through an aperture so that in a first condition said opaque members block the passage of light through said aperture and in a second condition unblock the passage of light through said aperture, means for generating a surge of current, control means for passing said surge of current through the strip of conductive material of said first opaque member in a selected direction and for passing said current through the strip of material of said second opaque member in a direction substantially opposite to said direction, thereby setting up an electromagnetic field about each conductive strip which exerts a force on the other conductive strip.

the magnitude of the current through each conductive strip and the orientation of the conductive strips relative to each other being such that the resultant of the interacting electromagnetic forces substantially alone changes said opaque members from one of said first and second conditions to the other of said first and second conditions.

14. The shutter set forth in claim 13 wherein said first and second opaque members each comprise a plate of conductive material.

15. The shutter set forth in claim 13 wherein said first and second opaque members each comprise a foil of conductive material.

16. The shutter set forth in claim 13 wherein said first and second opaque members each comprise a plate of nonconductive material having a conductor mounted thereon and wherein said current is passed through the conductors.

17. The shutter set forth in claim 13 including: a first and second conductive member, each associated with a respective one of said opaque members, and wherein said control means includes means for passing said surge of current through each conductive member in substantially the same direction as the flow of current in the strip of conductive material of the associated opaque member.

18. A shutter comprising: first and second opaque members, each including a strip of conductive material, said opaque members being positioned to control the passage of light through an aperture so that in a first condition said opaque members block the passage of light through said aperture and in a second condition unblock the passage of light through said aperture, means for generating a surge of current, and control means for passing said surge of current through the strip of conductive material of said first and second opaque members in substantially the same direction, thereby setting up electromagnetic field about each conductive strip which exerts a force on the other conductive strip, the magnitude of the current through each conductive strip and the orientation of the conductive strips relative to each other being such that the resultant of the interacting electromagnetic forces substantially alone changes said opaque members from one of said first and second conditions to the other of said first and second conditions.

19. The shutter set forth in claim 18 wherein said first and second opaque members each comprise a plate of conductive material.

20. The shutter set forth in claim 18 wherein said first and second opaque members each comprise a plate of nonconductive material having a conductor mounted thereon and wherein said current is passed through the conductors.

21. The shutter set forth in claim 18 including: a first and second conductive member, each associated with a respective one of said opaque members, and wherein said control means includes means for passing said surge of current through each conductive member in a direction substantially opposite to the flow of current in the strip of conductive material of the associated opaque member.

22. A shutter comprising: a first and second opaque member, each including a first and second strip of conductive material, means for positioning said first and second members side by side along a predetermined axis in such a manner that an edge of one member overlaps an edge of the other so that light will not pass through the overlapping edges, means for insulating the overlapping edges from each other, means for generating a surge of current, control means for passing said surge of current through the strip of conductive material of said first member in a selected direction and for passing said current through the strip of material of said second member in a direction substantially opposite to said direction, thereby setting up an electromagnetic field about each conductive strip which exerts a force on the other conductive strip, the magnitude of the current through each conductive strip and the orientation of the conductive strips relative to each other being such that the resultant of the interacting electromagnetic forces substantially alone changes said members from one of said first and second conditions to the other of said first and second conditions.

23. The shutter set forth in claim 22 wherein said first and second members each comprise a foil of opaque conductive material.

24. The shutter set forth in claim 22 wherein said first and second members each comprise a plate of conductive material.

25. The shutter set forth in claim 22 wherein said first and second members each comprise a plate of nonconductive material having a conductor mounted thereon and wherein said current is passed through the conductors.

References Cited by the Examiner

UNITED STATES PATENTS

| 1,686,355 | 10/1928 | Wente | 88—61 X |
| 2,077,193 | 4/1937 | Wente | 88—61 X |

FOREIGN PATENTS

| 887,007 | 9/1942 | Germany. |

JOHN M. HORAN, *Primary Examiner.*